US008092328B2

(12) United States Patent
Dec et al.

(10) Patent No.: US 8,092,328 B2
(45) Date of Patent: Jan. 10, 2012

(54) DUAL TENSIONER ASSEMBLY (75) Inventors: Piotr Dec, La Salle (CA); Sorin Ciobotaru, Sterling Heights, MI (US)

(73) Assignee: The Gates Corporation, Denver, CO (US)

( * ) Notice: Subject to any disclaimer, the term of this patent is extended or adjusted under 35 U.S.C. 154(b) by 450 days.

(21) Appl. No.: 12/495,387

(22) Filed: Jun. 30, 2009

(65) Prior Publication Data
US 2010/0331127 A1 Dec. 30, 2010

(51) Int. Cl.
F16H 7/12 (2006.01)

(52) U.S. Cl. ....................................... 474/135
(58) Field of Classification Search .................. 474/133, 474/134, 135, 111, 109
See application file for complete search history.

(56) References Cited

U.S. PATENT DOCUMENTS

| 3,400,900 | A | | 9/1968 | Goode |
| 3,977,266 | A | | 8/1976 | Tantlinger |
| 4,798,564 | A | | 1/1989 | Benedict |
| 5,304,100 | A | * | 4/1994 | Awasaka et al. ............... 474/135 |
| 5,967,919 | A | * | 10/1999 | Bakker ........................... 474/94 |
| 6,120,401 | A | | 9/2000 | Wilken |
| 6,565,468 | B2 | | 5/2003 | Serkh |
| 6,582,332 | B2 | | 6/2003 | Serkh |
| 6,652,401 | B2 | * | 11/2003 | Liu ............................... 474/134 |
| 6,896,632 | B2 | | 5/2005 | Redmond |
| 7,004,863 | B2 | | 2/2006 | Serkh et al. |
| 7,419,447 | B2 | * | 9/2008 | Serkh ............................ 474/134 |
| 7,494,434 | B2 | | 2/2009 | McVicar et al. |
| 7,530,911 | B2 | * | 5/2009 | Serkh ............................ 474/134 |
| 7,901,310 | B2 | * | 3/2011 | Lolli et al. .................... 474/134 |
| 2002/0039944 | A1 | | 4/2002 | Ali et al. |
| 2002/0086751 | A1 | | 7/2002 | Bogner et al. |
| 2003/0153421 | A1 | * | 8/2003 | Liu ............................... 474/134 |
| 2003/0159535 | A1 | | 8/2003 | Grover et al. |
| 2005/0282669 | A1 | | 12/2005 | Bauer |
| 2006/0287146 | A1 | * | 12/2006 | McVicar et al. .............. 474/109 |
| 2007/0037648 | A1 | | 2/2007 | Di Giacomo et al. |

FOREIGN PATENT DOCUMENTS

| DE | 10359162 A1 | 7/2005 |
| JP | 6174020 A | 6/1994 |
| JP | 8-116755 A | 5/1996 |

OTHER PUBLICATIONS

International Search Report on PCT/US2010/040213.*
U.S. Appl. No. 10/147,183, filed Aug. 18, 2004, Serkh et al.
U.S. Appl. No. 12/077,656, filed Mar. 20, 2008, D'Silva et al.
U.S. Appl. No. 12/004,537, filed Dec. 21, 2007, Stegelmann.
U.S. Appl. No. 11/894,935, filed Aug. 22, 2007, Stegelmann.
U.S. Appl. No. 11/900,716, filed Sep. 13, 2007, D'Silva et al.

* cited by examiner

*Primary Examiner* — Michael Mansen
*Assistant Examiner* — Robert Reese
(74) *Attorney, Agent, or Firm* — P. N. Dunlap, Esq.; J. A. Thurnau, Esq.; T. A. Dougherty (57) ABSTRACT

A dual tensioner assembly for a two-belt drive system including a mounting bracket, a first and second cup coaxial and integrally formed on opposite sides of the mounting bracket with a common base wall having a hub formed therein, a first and second pivot arm each having an integral cylindrical member and each having a tensioner pulley journaled thereon, a tensioning mechanism in each cup biasing its respective pivot arm, a pivot shaft in each cup that is fitted into the hub, and a sleeve bushing on each pivot shaft pivotably supporting its respective cylindrical members.

14 Claims, 8 Drawing Sheets

DUAL TENSIONER ASSEMBLY

BACKGROUND OF THE INVENTION

1. Field of the Invention

This invention relates generally to a two-belt drive system having dual independent damped tensioners with a common pivot, more particularly to a dual tensioner assembly with two torsion springs in a common housing that each bias the position of a pivot-arm to which a belt engaging pulley is rotatably mounted. The tensioner of the invention with its damping mechanism is particularly useful in controlling tension of the multi-V-ribbed belts of a front end accessory drive for automotive or truck engine applications.

2. Description of the Prior Art

Belt tensioners are used to impart a load on a belt. Typically the belt is used in an engine application for driving various accessories associated with the engine. For example, an air conditioning compressor and alternator are two of the accessories that may be driven by a belt drive system. A belt tensioner may include a pulley journaled to an arm which is pivotable on a base. A spring is connected between the arm and a base. The spring may also engage a damping mechanism. The damping mechanism may include frictional surfaces in contact with each other. The damping mechanism damps an oscillatory movement of the arm caused by operation of the belt drive. This in turn enhances a belt life expectancy and the tensioner life expectancy, by minimizing wear on movable components.

Representative of the art is U.S. Pat. No. 6,565,468 to Serkh, U.S. Pat. No. 7,004,863 to Serkh et al., and U.S. Pat. No. 6,582,332 to Serkh, the entire contents of which are all hereby incorporated herein by reference.

Sometimes two belts are used in close proximity on the same engine for example to divide the various accessory loads for improved belt life. In such a case, two tensioners may be used, one for each belt. On the other hand, various tensioner designs have been proposed which simultaneously tension two belts. Representative of the art is U.S. Pat. No. 4,798,564 to Benedict which discloses a single tensioner used to tension a double belt drive, which has a spring-biased primary arm with a secondary arm freely pivoted on the end thereof and having two idler pulleys for simultaneous tensioning of two belts. U.S. Pat. Pub. No. 2003/0159535 A1 to Grover et al. discloses a two belt drive with two identical tensioners stacked one on the other.

Other dual tensioners have been applied to single belt drives which have load reversals, such as starter-generator applications, in order to tensioner either or both of two spans of the same belt. Representative of the art is U.S. Pat. Pub. No. 2002/0039944A1 to Ali, et al. which discloses a tensioner with two mutually biasing tensioner pulleys. Since such tensioners work in concert on a single belt, they have a single torsion spring.

SUMMARY

The present invention is directed to systems and methods which provide independent tensioning with damping of two belts within a limited space, with excellent strength or stiffness, and in a relatively light-weight package.

The dual tensioner assembly according to the invention includes a mounting bracket, a first and second cup coaxial and integrally formed on opposite sides of the mounting bracket with a common base wall having a hub formed therein, a first and second pivot arm each having an integral cylindrical member and each having a tensioner pulley journaled thereon, a tensioning mechanism in each cup biasing its respective pivot arm, a pivot shaft in each cup that is fitted into the hub, and a sleeve bushing on each pivot shaft pivotably supporting its respective cylindrical members. The pivot shafts may be flanged to hold the tensioning mechanism, bushing, etc. in place in each cup. The pivot shafts may be fastened together coaxially.

The base wall between the two cups may be contoured to accommodate the shape of the tensioning mechanisms. The tensioning mechanisms independently bias the pivot arms in the same or opposite directions, and may tension the respective belts in either clockwise or counter-clockwise direction. One or both tensioners may include a damping mechanism.

The tensioning mechanisms may have left-handed helical torsion springs, right-handed helical torsion springs, or one of each. The helical torsion springs have a spring end which engages with the base such that the two spring ends are engaged on substantially opposite sides of the hub. The torsion spring may be engaged or attached at one end to the cup or base and at the other end to a damping mechanism.

The invention is also directed to a two-belt drive system having two power transmission belts, at least two driver pulleys, at least two driven pulleys, and the dual tensioner assembly according to an embodiment of the invention. The two driver pulleys may be coaxial or mounted on a common driver shaft. The driven pulleys could be one or more accessory pulleys including a water pump pulley, an air conditioning compressor pulley, an alternator pulley, a power steering pulley, a fan pulley, a starter/generator pulley or the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
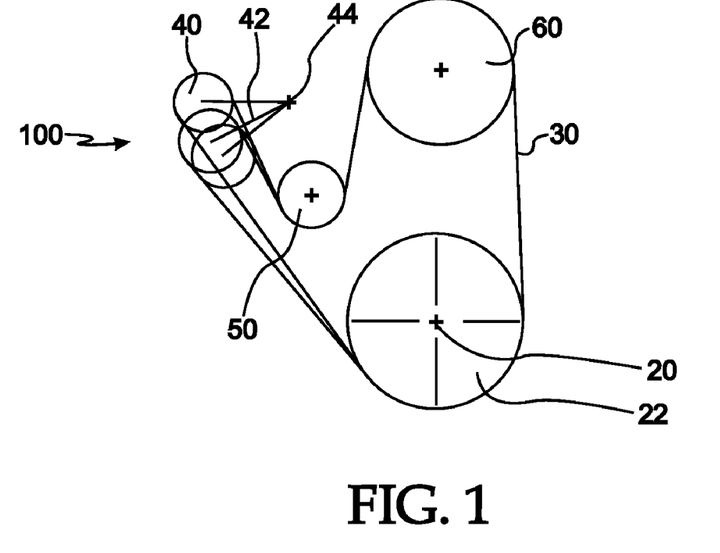
FIG. 1 is a front view schematic of a first front end accessory drive system that includes a dual belt tensioner of the invention.
Figure 2:
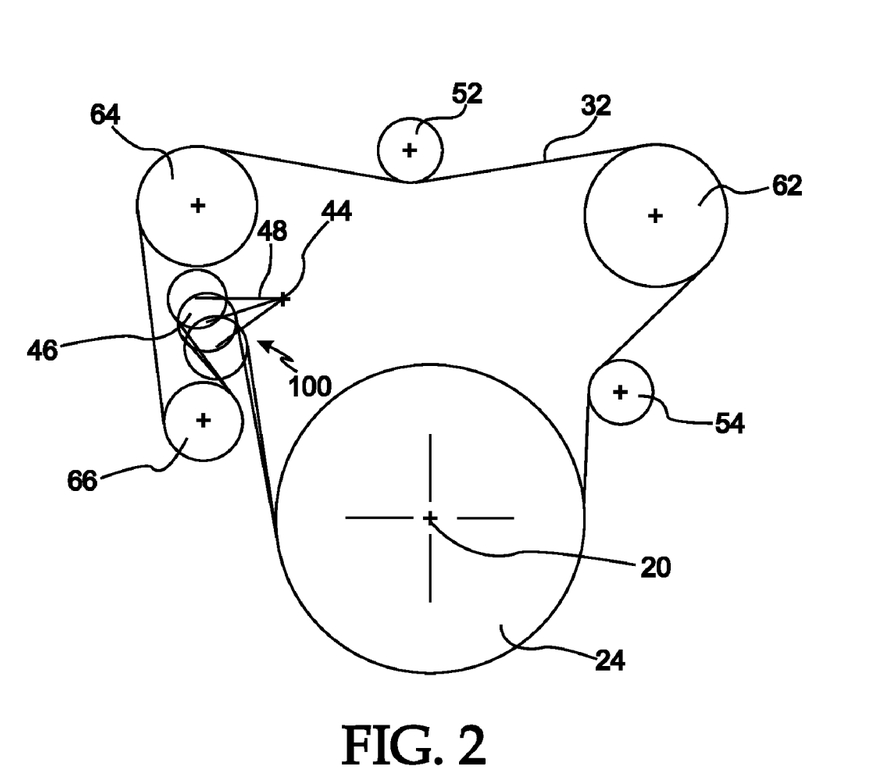
FIG. 2 is a front view schematic of a second front end accessory drive system that includes the dual belt tensioner of FIG. 1.
Figure 3:
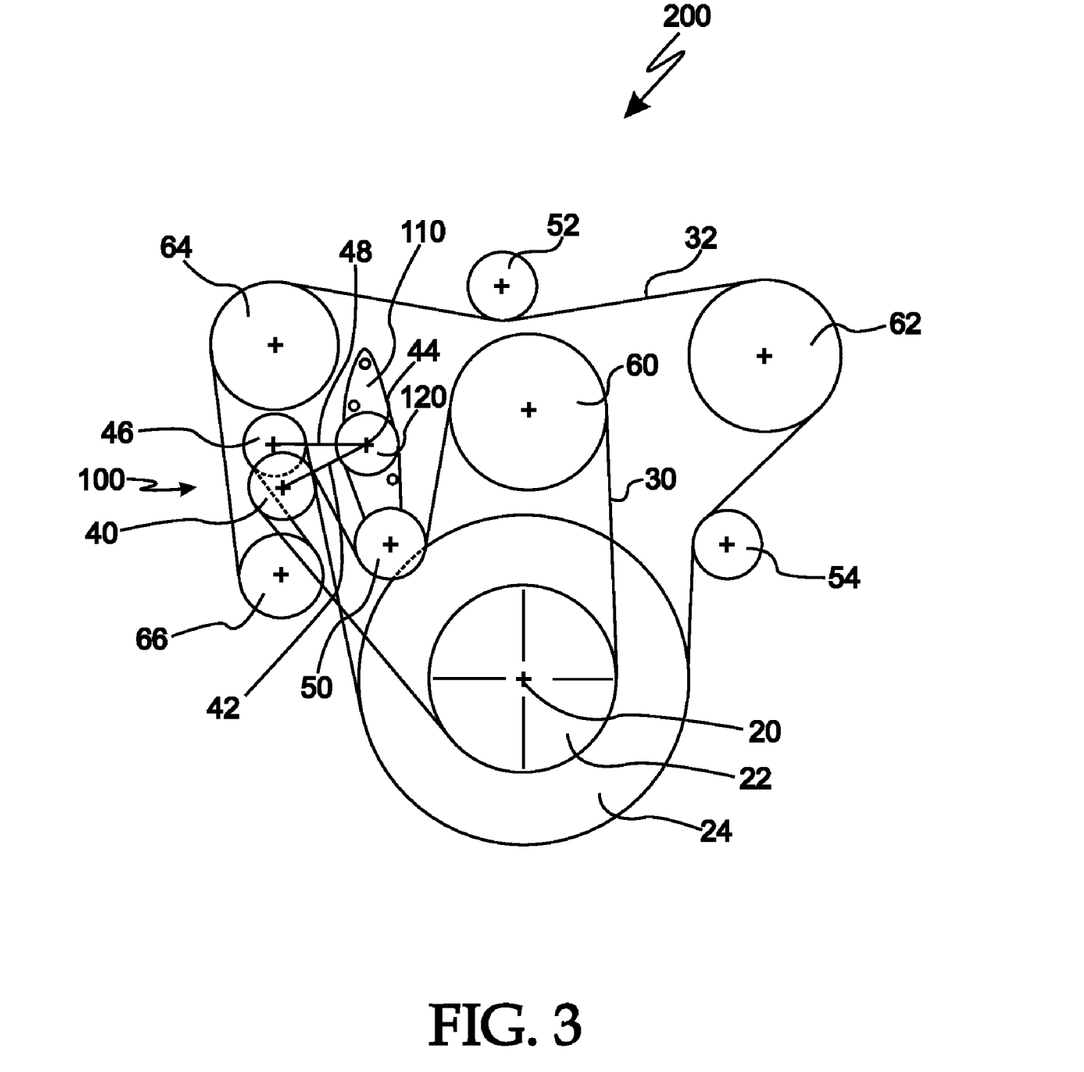
FIG. 3 is a front view schematic of the two drive systems of FIGS. 1 and 2 combined and including the dual belt tensioner of FIG. 1.

Referring to FIGS. 1, 2, and 3, dual belt-tensioner assembly 100 with pulleys 40, 46, and 50 is illustrated as a component part of a two-belt drive system that includes belts 30 and 32 and several pulleys. By way of example, the first belt 30 is trained around a crank pulley 22, accessory pulley 60 (which could be for example a fan or water pump pulley), idler 50, and first tensioner pulley 40. Tensioner pulley 40 engages the belt 30 and is shown in several positions to schematically show how pulley 40 is mounted on first pivot arm 42 and moves about pivot axis 44 to maintain the first belt tension. The second belt 32 is trained around second crank pulley 24 which is coaxial with crank pulley 22 since both are mounted on the crank shaft at 20. Second belt 32 is also trained around three accessory pulleys 60, 62, and 64 (which could include for example a water pump pulley, an air conditioning compressor pulley, an alternator pulley, a power steering pulley or the like), idler pulleys 52 and 54, and second tensioner pulley 46. Tensioner pulley 46 engages the belt 32 and is shown in several positions to schematically show how pulley 46 is mounted on second pivot arm 48 and moves about pivot axis 44 to maintain the second belt tension.

FIG. 3 shows the complete dual belt drive 200 including dual tensioner 100. Tensioner 100 includes mounting bracket 110 with integral spring housing 120. Pivot arms 42 and 48 have common pivot 44. Idler pulley 50 represents a third pulley that is optionally mounted on bracket 110 for convenience. Both pivot arms are arranged to bias the respective belts in a clockwise direction when the system is viewed as in FIGS. 1-3, but other biasing arrangements, other numbers of pulleys, and other layouts are possible.

Figure 4:
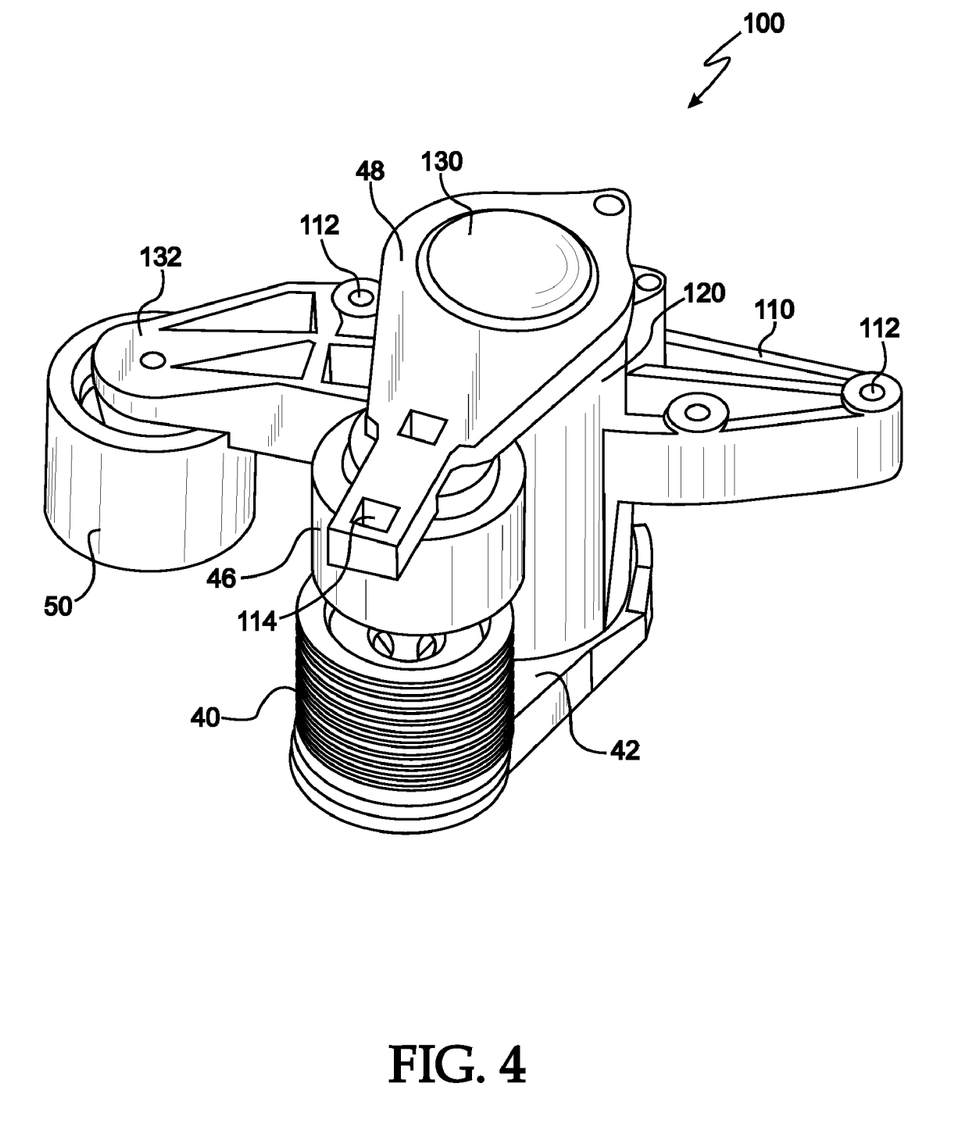
FIG. 4 is a perspective view of a dual tensioner assembly of the invention.

FIG. 4 shows an embodiment of the invention in the form of dual tensioner assembly 100 in perspective view. Tensioner assembly 100 is built around mounting bracket 110, which has, for example, holes 112 for mounting with bolts or other fastening means. Integral with bracket 110 is cylindrical base 120 which houses the torsion springs and other components (for example under dust seal 130). Each end of base 120 receives a cylindrical member to which a pivot arm is attached. First pivot arm 42 and second pivot arm 48 thus pivot about a common axis which is the axis of the cylindrical members and base. Each cylindrical member is pivotably supported on a pivot shaft which is attached to the base. The pivot arms also have pulleys journaled thereon. Pivot arm 48 has backside idler pulley 46 thereon, and features square hole 114 for use during installation of a belt. Pivot arm 42 has grooved idler pulley 40 for tensioning a multi-V-ribbed belt thereon. The pivot arms are biased by the torsion springs to apply tension to the belts. The bracket includes optional fixed arm 132 with idler 50 journaled thereon.

According to the invention, the cylindrical base is integral with the bracket and projects from both sides of the bracket. The bracket forms a wall or partition through the middle portion of the base. The base has openings at each end to receive the tensioning and damping mechanisms, the pivot shafts, cylindrical portions of the pivot arms, etc. Thus, the base is like two cups arranged bottom-to-bottom with a common bottom or base wall that also forms a portion of the bracket. The bottom may wall within each cup may be shaped or contoured to accommodate the shapes of the tensioning mechanisms housed therein, so that the base wall may have minimum weight, or the cups occupy minimum space, or to optimize bracket stiffness or strength or to meet some other desired criterion. Thus, embodiments of the invention may provide compact, efficient, lightweight, independent tensioning of two belts in a two-belt drive system.

Figure 5:
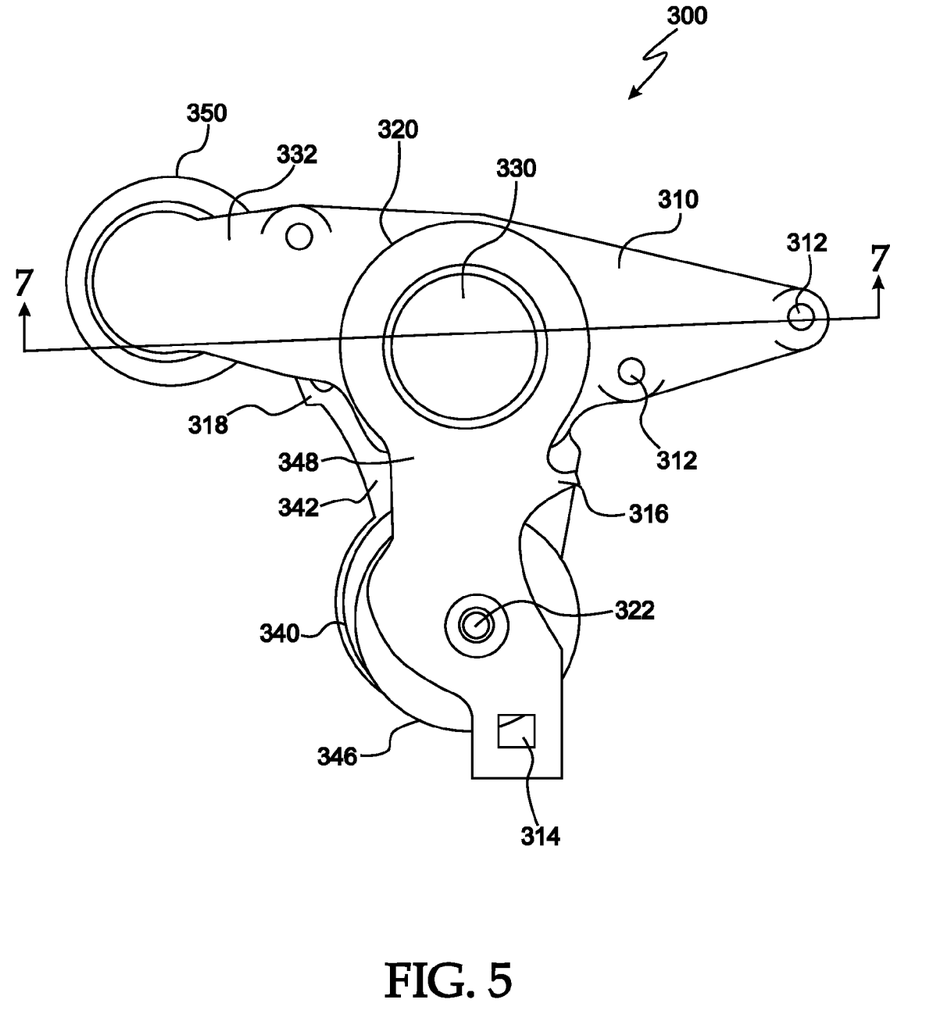
FIG. 5 is a top view of a dual tensioner assembly of the invention.

FIGS. 5-9 show various views of a second embodiment of a dual tensioner assembly according to the invention along with details of the internal tensioning mechanisms. Differences from the first embodiment of FIG. 4 include the number and type of added features on the pivot arms for use during installation and the like. FIG. 5 shows a top view of dual tensioner assembly 300. It should be understood the terms "top" and "bottom" are used in an arbitrary way to identify the various views, since the tensioner may be mounted in any desired orientation. For example, if tensioner 300 were mounted on the drive of FIG. 3, assuming belts running in vertical planes, the so-called bottom view of FIG. 6 would be a front view and the top view of FIG. 5 would be a rear view.

Tensioner assembly 300 is built around mounting bracket 310, which has, for example, holes 312 for mounting with bolts or other fastening means to an engine or belt-drive system frame. Integral with bracket 310 is cylindrical base 320 which houses the torsion springs and other components (for example under dust seal 330) to be described in more detail later. Each end of base 320 receives a cylindrical member to which a pivot arm is attached. First pivot arm 342 and second pivot arm 348 thus pivot about a common axis which is the axis of the cylindrical members and base. The pivot arms have pulleys journaled thereon. Pivot arm 348 has backside idler pulley 346 fastened thereon by bolt 322, and includes square hole 314 for use during installation of a belt and protrusion 316 for use as a stop. Pivot arm 342 has grooved idler pulley 340 for tensioning a multi-V-ribbed belt thereon, and includes protrusion and hole 318 for use during installation of a belt. The pivot arms are biased by the torsion springs to apply tension to the belts. The bracket includes optional fixed arm 332 with idler 350 journaled thereon.

Figure 6:
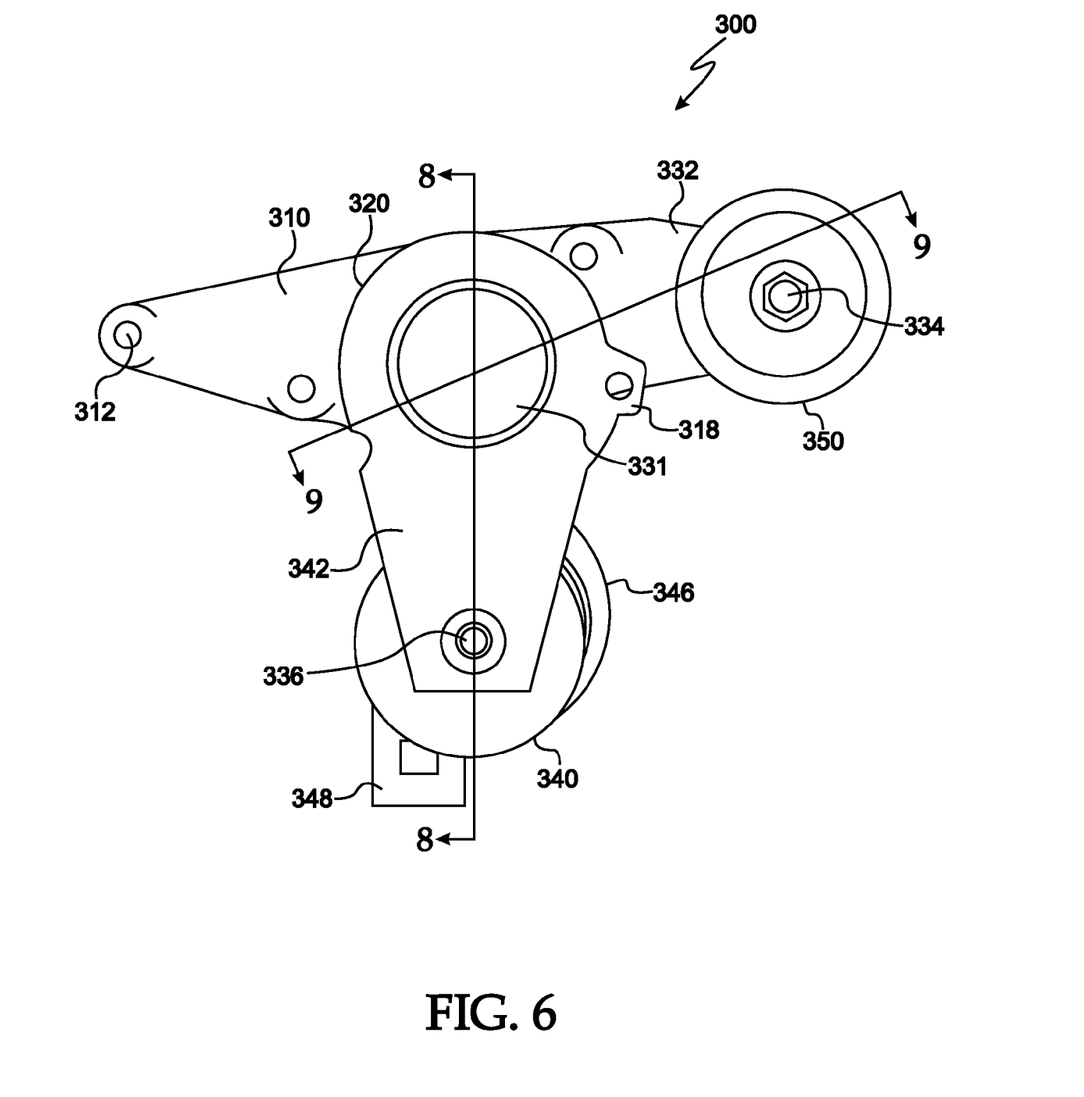
FIG. 6 is a bottom view of the dual tensioner assembly of FIG. 5.

FIG. 6 shows a bottom view of dual tensioner assembly 300. Tensioner assembly 300 is built around mounting bracket 310, which has, for example, holes 312 for mounting with bolts or other fastening means. Integral with bracket 310 is cylindrical base 320 which houses the torsion springs and other components (for example under second dust seal 331) to be described in more detail later. Pivot arm 348 has backside idler pulley 346. Pivot arm 342 has grooved idler pulley 340 fastened thereon by bolt 336, and includes protrusion and hole 318 for use during installation of a belt. The bracket 310 includes optional fixed arm 332 with idler 350 journaled thereon with fastener 334 which fastens into mount 352 (which is identified in FIGS. 7 and 9).

Figure 7:
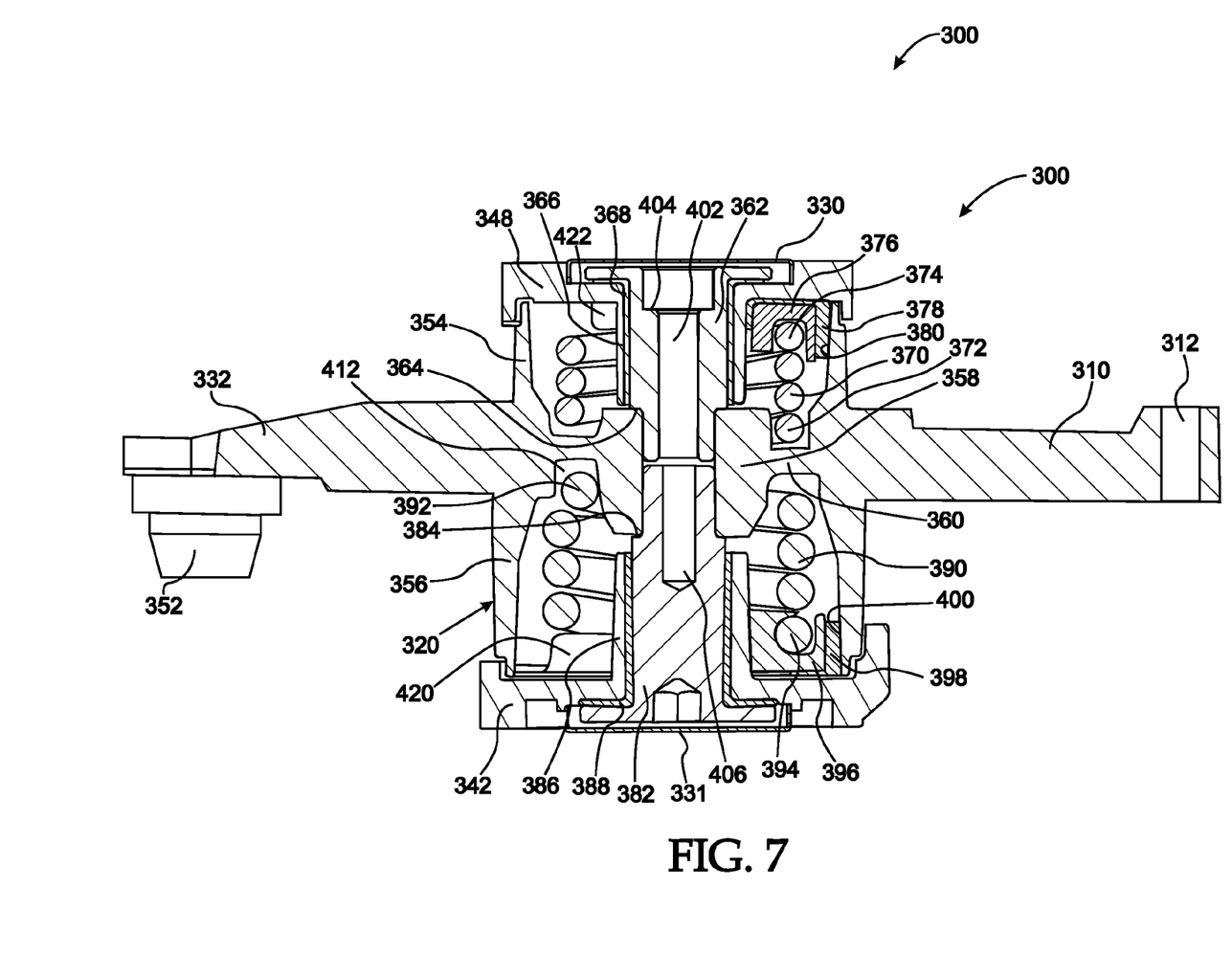
FIG. 7 is a cross-sectional view taken along line 7-7 of FIG. 5.
Figure 8:
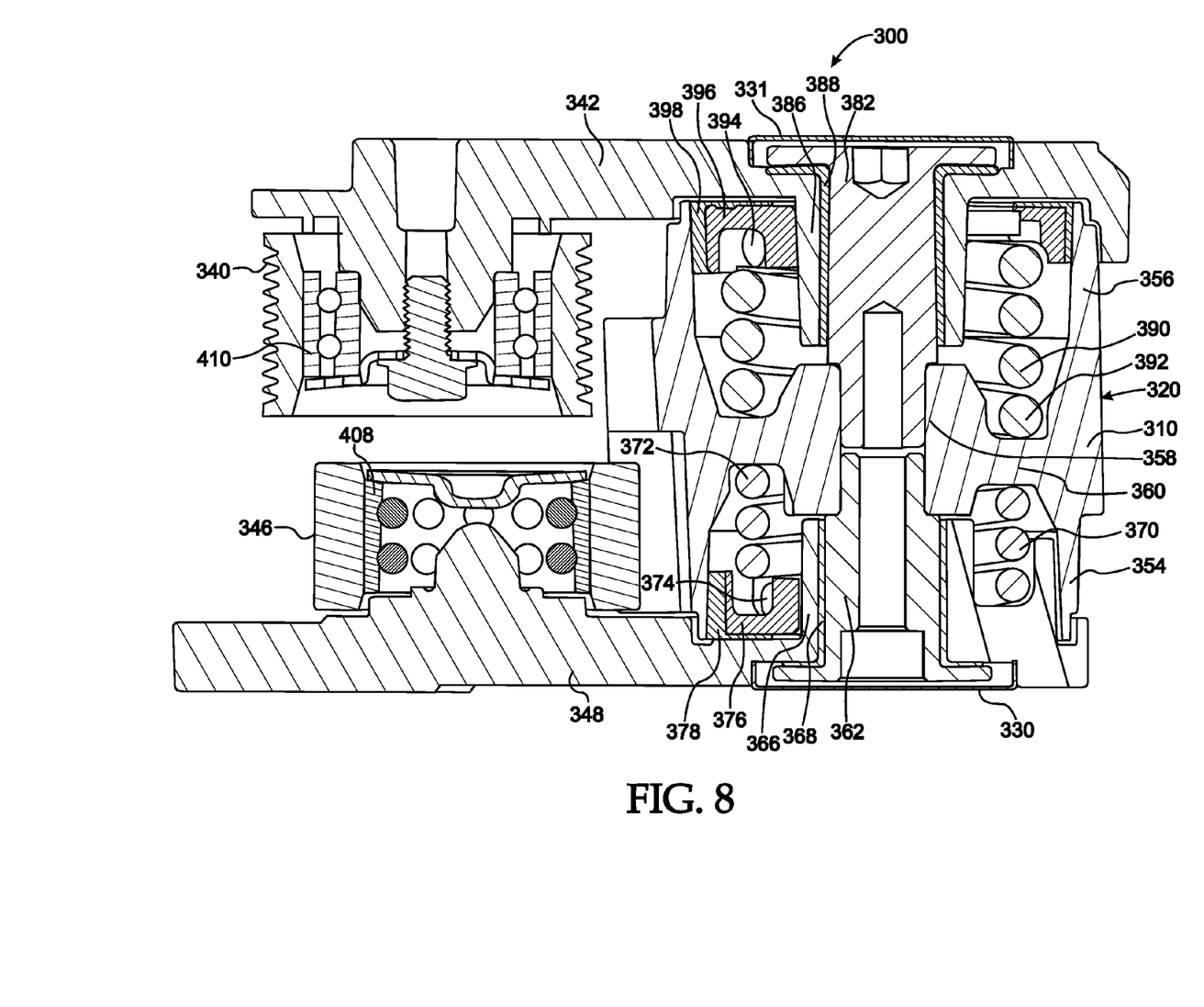
FIG. 8 is a cross-sectional view taken along line 8-8 of FIG. 6.

FIG. 7 shows a sectional view along line 7-7 of the embodiment of FIG. 5, and FIG. 8 shows a sectional view along line 8-8 of the embodiment of FIG. 6, to illustrate the internal details of one embodiment of the inventive dual tensioner assembly. Bracket 310 comprises integral housing 320 which comprises first cup 356, second cup 354, and hub 358. Cups 354 and 356 are integrally formed in a bottom-to-bottom configuration, sharing a common base wall 360 that is substantially in the plane of bracket 310. First cup 356 houses the tension and damping mechanism for the first tensioner, which comprises first pivot arm 342 with pulley 340 journaled thereon via bearing 410. First pivot shaft 382 is attached to hub 358 and sleeve-type bushing 388 is positioned thereon. The bushing has a bearing surface that supports cylindrical member 386 of first pivot arm 342. Pivot shaft 382 may have shoulder 384 which abuts hub 358.

The tensioning mechanism for the first tensioner includes torsion spring 390, a first end 392 of which engages first cup 356 near base wall 360, while the second end 394 of which engages damping shoe 396. The damping mechanism shown comprises damping shoe 396, with damping pad 398 mounted thereon. The damping mechanism is mounted between the cup and the pivot arm and has a working surface which is slidably engaged under pressure from the torsion spring with the inner wall of the cup and/or with the pivot arm. In the embodiment shown, pad 398 is slidably engaged with friction surface 400 which is a portion of the inner wall of cup 360. Pivot arm 342 has stop 420 which engages damping shoe 396 so that motion of the pivot arm is transferred to spring end 394 via the shoe. Spring 390 thus generates a spring force opposing pivot arm motion since the other spring end 392 is engaged with the base. At the same time, the shoe motion creates a frictional damping force opposing pivot arm motion. The means of engagement of the spring with the base in the embodiment shown comprises spring end 392 being straightened and bent inward to form a chordal portion which resides in narrow receiving portion 412 in the base.

Second cup 354 houses the tension and damping mechanism for the second tensioner which comprises second pivot arm 348 with pulley 346 journaled thereon via bearing 408. Second pivot shaft 362 is attached to hub 358 and sleeve-type bushing 368 is positioned thereon. The bushing has a bearing surface that supports cylindrical member 366 of second pivot arm 342. Pivot shaft 362 may have shoulder 364 which abuts hub 358.

The tensioning mechanism for the second tensioner includes torsion spring 370, a first end 372 of which engages second cup 354 near base wall 360, while the second end 374 of which engages damping shoe 376. The damping mechanism shown comprises damping shoe 376, with damping pad 378 mounted thereon. The damping mechanism is mounted between the cup and the pivot arm and has a working surface which is slidably engaged with the inner wall of the cup and/or with the pivot arm under pressure from the torsion spring. In the embodiment shown, pad 378 is slidably engaged with friction surface 380 which is a portion of the inner wall of cup 360. Pivot arm 348 has stop 422 which engages damping shoe 376 so that motion of the pivot arm is transferred to spring end 374 via the shoe. Spring 370 thus generates a spring force opposing pivot arm motion since the other spring end 372 is engaged with the base. At the same time, the shoe motion creates a frictional damping force opposing pivot arm motion. The means of engagement of the spring with the base in the embodiment shown comprises spring end 372 being straightened and bent inward to form a chordal portion which resides in a narrow receiving portion in the base.

One or both damping mechanisms may be an asymmetric damping mechanism as described in U.S. Pat. No. 7,004,863, which is incorporated herein by reference. Alternately, the damping mechanisms may be symmetric, or the damping mechanism may be omitted and the appropriate end of the torsion spring may engage the pivot arm directly. Preferably the damping mechanism is mounted substantially between the corresponding tensioner pulley and pivot bushing along a plane parallel with the pivot shaft as described for example in U.S. Pat. No. 6,565,468, which is incorporated herein by reference, so the hub loads can be balanced more effectively with substantially less load on the pivot bushing.

Pivot shafts 362, 382 also serve as fasteners to hold pivot arms 342, 348 and bushings 368, 388 in place and compress springs 370, 390. Thus, pivot shafts 362, 382 are shown having retaining flanges and they may be press fit into hub 358. For added holding power, the two pivot shafts may be fastened together, for example, one pivot shaft may be bored through and the other provided with a threaded bore for a bolt. In the FIG's., shaft 362 is provided with bore 402 and countersink 404. Shaft 382 is provided with threaded hole 406. The two shafts may thus be held together by a bolt, threads, or other fastening means.

Figure 9:
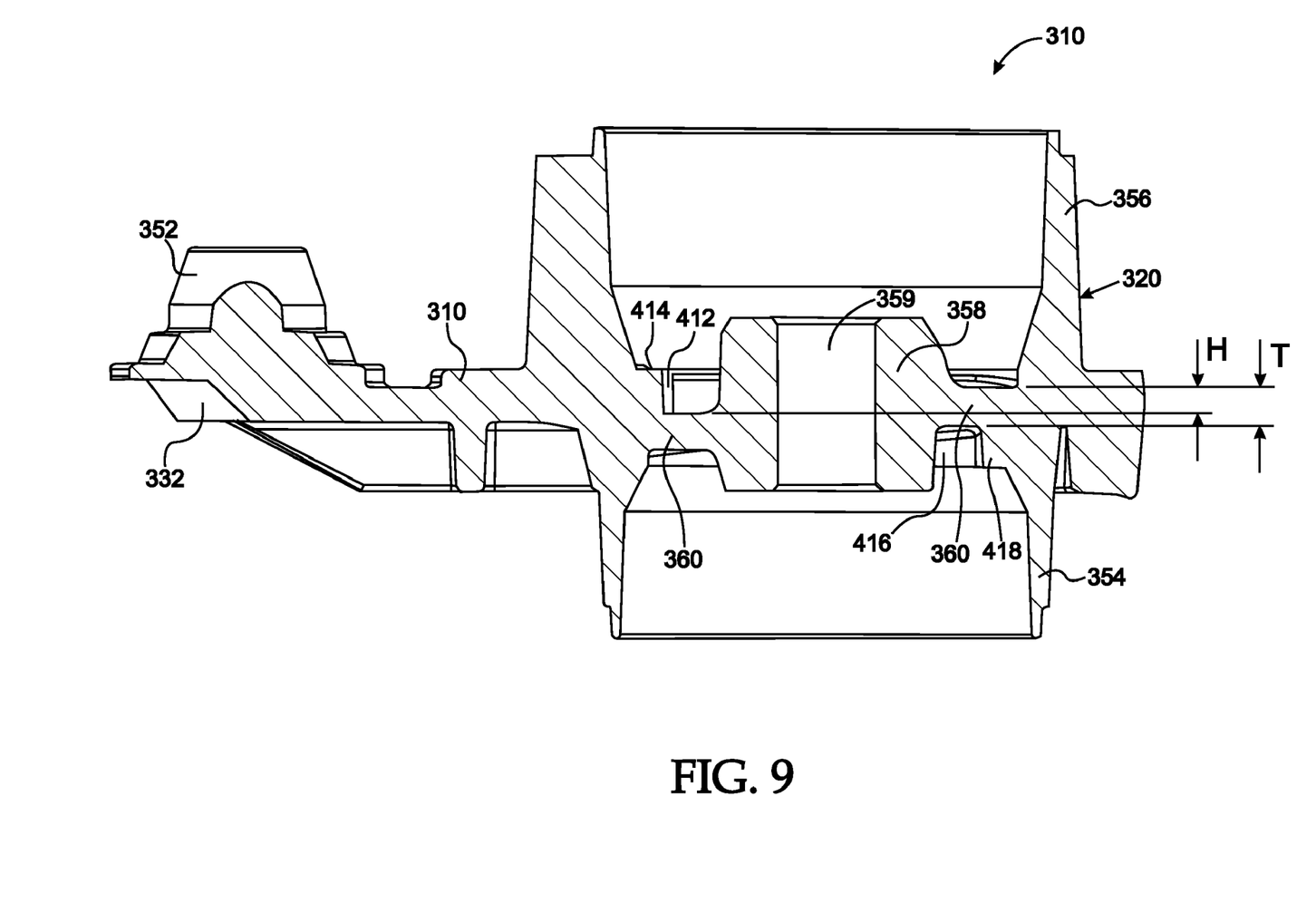
FIG. 9 is a cross-sectional view of a component of the invention taken along line 9-9 of FIG. 6.

FIG. 9 shows a section of bracket 310 according to an embodiment of the invention. FIG. 9 illustrates some advantageous features of a bracket with integral cups for two tensioners. Bracket 310 has cups 354 and 356 with hub 358 bored through at 359 to accept two pivot shafts as described before. Base wall 360 is not flat, being contoured to accommodate the shapes of the two torsion springs in order to allow minimum base wall thickness, T. Thus, at least a portion of base wall 360 is shown as having a helical pitch represented by distance, H. FIG. 9 also illustrates that the annular region between hub 358 and the cylindrical wall of cup 356 includes narrow receiving portion 412 formed by protrusion 414. This receiving portion may engage the end of the torsional spring as described above. Likewise, the other cup 354 includes narrow receiving portion 416 formed by protrusion 418 from the wall of the cup for engaging the other torsion spring. For optimum space saving and optimum base wall 360 thickness, it is preferable that the two receiving portions 412 and 416 are located on substantially opposite sides of the base 320. In other words the two torsion spring ends 372 and 392 are engaged to the base substantially on opposites of the base. The base wall may then be appropriately contoured in each cup to accommodate the spring shape and provide a desired base wall thickness to optimize structural support and/or bracket weight. It should be noted that the embodiment of the figures has two torsion springs of opposite helical twist, one left-handed and the other right-handed. Two torsion springs of like helical twist could be utilized with the same engagement arrangement and orientation considerations as described above. Either way, the base wall may be appropriately contoured to accommodate the shapes of the tensioning mechanisms in each cup and to thereby permit close axial positioning of the two tensioning mechanisms relative to the axial spacing achievable with a flat bottom wall or partition.

If two tensioners had been simply stacked or perhaps attached onto either side of a bracket or plate, the base wall thickness would have been at least approximately doubled relative to that of the invention, with resulting increase in space requirements and weight requirements for the dual tensioner. Yet the stiffness of the resulting assembly could still be limited by the means used to fasten the two tensioners together. The integral bracket and cup of the present invention permits the dual tensioner assembly to occupy minimum space and be of optimal weight and/or stiffness.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A dual tensioner assembly comprising:
a mounting bracket;
a first and second cup coaxial and integrally formed on opposite sides of said mounting bracket with a common base wall having a hub formed therein;
a first and second pivot arm each having an integral cylindrical member and each having a tensioner pulley journaled thereon;
a tensioning mechanism in each of said first and second cups, each biasing one of said first and second pivot arms;
a first and second pivot shaft each extending into one of said first and second cups fitted into said hub; and
a sleeve bushing on each of said first and second pivot shafts pivotably supporting each of said cylindrical members.

2. The assembly of claim 1 wherein said base wall is contoured to accommodate the shape of said tensioning mechanisms.

3. The assembly of claim 1 wherein said pivot shafts are fastened together.

4. The assembly of claim 1 wherein said tensioning mechanisms independently bias said pivot arms in the same direction, either clockwise or counter-clockwise.

5. The assembly of claim 1 wherein one said tensioning mechanism comprises a left-handed helical torsion spring, and the other said tensioning mechanism comprises a right-handed helical torsion spring.

6. The assembly of claim 1 wherein said tensioning mechanisms each comprise a helical torsion spring having a spring end which engages with the bracket such that the two spring ends are engaged on substantially opposite sides of the hub.

7. The assembly of claim 1 further comprising a damping mechanism in at least one said cup.

8. The assembly of claim 1 further comprising a damping mechanism in each said cup.

9. The assembly of claim 1 wherein each said tensioning mechanism comprises a torsion spring attached at one end to said cup and at the other end to a damping mechanism.

10. A two-belt drive system comprising two power transmission belts, two driver pulleys, at least two driven pulleys, and the dual tensioner assembly comprising:
a mounting bracket;
a first and second cup coaxial and integrally formed on opposite sides of said mounting bracket with a common base wall having a hub formed therein;
a first and second pivot arm each having an integral cylindrical member and each having a tensioner pulley journaled thereon;
a tensioning mechanism in each of said first and second cups, each biasing one of said first and second pivot arms;
a first and second pivot shaft each extending into one of said first and second cups fitted into said hub; and
a sleeve bushing on each of said first and second pivot shafts pivotably supporting each of said cylindrical members.

11. The system of claim 10 wherein said two driver pulleys are mounted on a common drive shaft.

12. The system of claim 10 wherein said base wall is contoured to accommodate the shape of said tensioning mechanisms.

13. The system of claim 12 wherein said tensioning mechanisms each comprise a helical torsion spring having a spring end which engages with the bracket such that the two spring ends are engaged on substantially opposite sides of the hub.

14. The system of claim 13 further comprising a damping mechanism in each said cup.

* * * * *